UNITED STATES PATENT OFFICE.

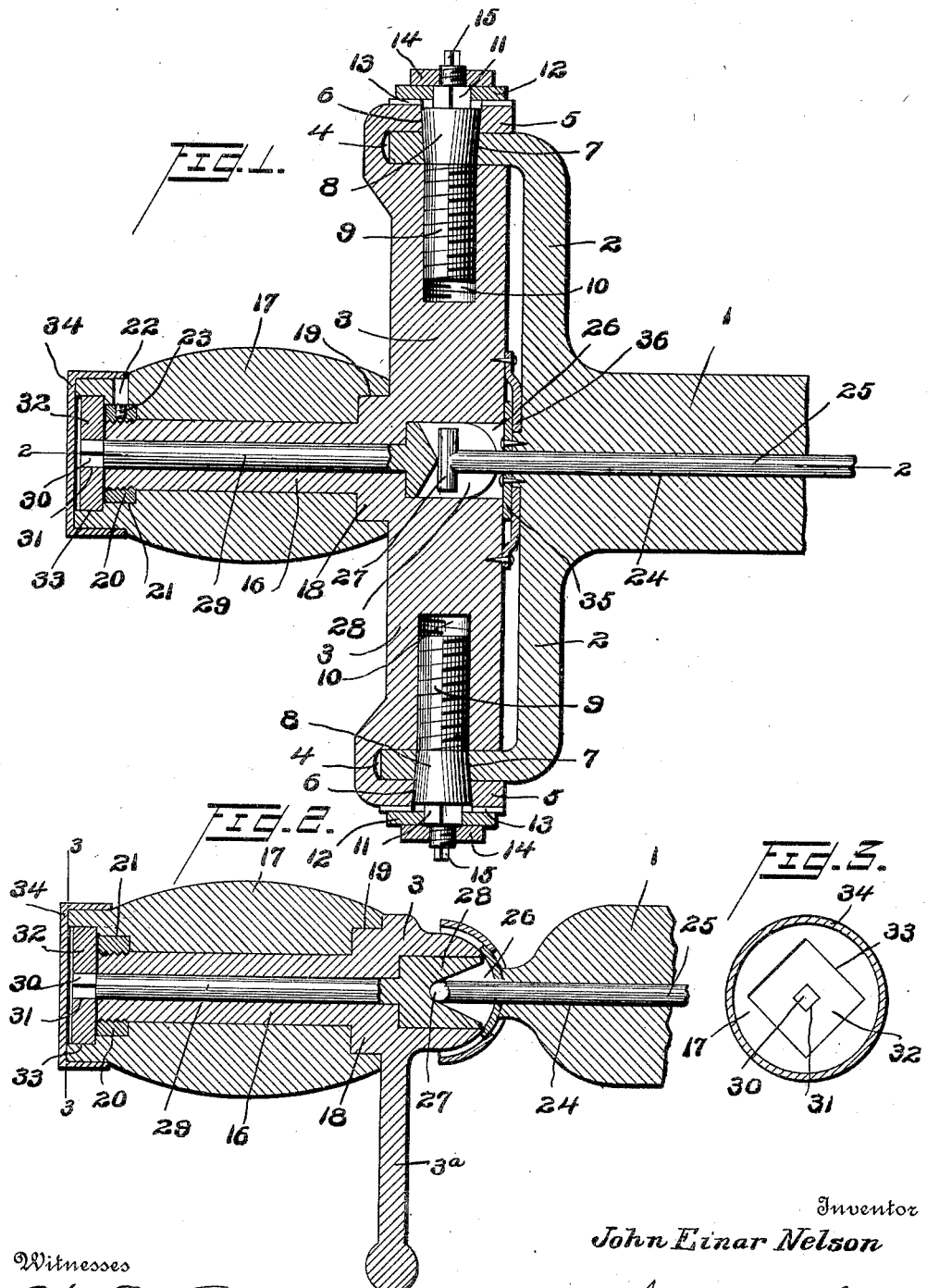

JOHN EINAR NELSON, OF HETTINGER, NORTH DAKOTA.

VEHICLE STEERING-KNUCKLE.

1,098,830.  Specification of Letters Patent.  Patented June 2, 1914.

Application filed May 10, 1913. Serial No. 766,749.

*To all whom it may concern:*

Be it known that I, JOHN EINAR NELSON, a citizen of the United States, residing at Hettinger, in the county of Adams and State of North Dakota, have invented certain new and useful Improvements in Vehicle Steering-Knuckles, of which the following is a specification.

My invention relates to improvements in vehicle steering knuckles, and more particularly to a construction which renders the steering wheels capable of receiving power to act as drivers as well as steering wheels, the object of the invention being to provide a construction of this character in which the parts may be readily assembled and taken apart as well as adjusted to compensate for wear.

A further object is to provide improved shaft coupling means in the steering knuckle which permits a positive drive of the wheel hub at any angle of the knuckle.

With these and other objects in view, the invention consists in certain novel features of construction and combinations and arrangements of parts as will be more fully hereinafter described and pointed out in the claim.

In the accompanying drawings: Figure 1 is a view in vertical longitudinal section illustrating my improvements. Fig. 2 is a view in section on the line 2—2 of Fig. 1, and Fig. 3 is a view in section on the line 3—3 of Fig. 2.

1 represents an axle having a forked end 2 in which my improved knuckle 3 has rotary mounting, and an integral steering arm 3ª is provided on said knuckle. The upper and lower ends of the knuckle 3 are recessed as shown at 4 to receive the fork shaped ends of axle 1, so that above and below said fork shaped ends, knuckle 3 has overlapping tongues 5. The tongues 5 and the forked ends 2 are provided with registering conical openings 6 and 7 respectively to receive the conical enlarged ends 8 of screws 9. These screws engage in threaded sockets 10 in knuckle 3 and are adjusted vertically in said sockets to take up wear of the bearing. The outer ends of the screws 6, adjacent the conical enlargements 8, are made angular as shown at 11 to enter angular openings in washers 12, said washers 12 having serrated inner faces engaging serrated surfaces 13 on the tongues 5. Nuts 14 are screwed onto threaded outer portions of the screws 9 against the washers 12, and when binding the serrated surfaces of the washer against the serrated surface 13 of the tongue, said washers are held against possibility of rotary movement, and the screws 9 securely locked in place. The extreme outer ends of screws 9 are made angular as shown at 15 for the reception of a wrench to turn the screws to adjust them to proper position, but it is of course to be understood that before any adjustment may be made, the nuts 14 must be loosened.

Knuckle 3, midway between its ends is made with an integral tubular stub 16 around which a wheel hub 17 is adapted to turn. The stub 16 adjacent knuckle 3 is enlarged annularly as shown at 18, and enters a correspondingly enlarged recess 19 in the inner end of hub 17. The outer end of stub 16 is externally screw-threaded to receive a circular nut 20 located in a recess 21 in the hub 17 and held against accidental movement by a jam screw 23 which may be positioned through a lateral opening 22 in hub 17. This nut 20 holds the hub on the stub and may be adjusted to take up wear.

Axle 1 is provided with a longitudinal bore 24 in which a driving shaft 25 is mounted to turn. This driving shaft 25 projects into a pocket 26 in knuckle 3, and is formed with a T-head 27 in said pocket which engages a bifurcated enlargement 28 on the end of a short shaft 29. The short shaft 29 turns freely in the tubular stub 16, and at its outer end is made angular as shown at 30 and positioned in an angular central opening 31 in a rectangular block 32. This block 32 fits within a rectangular recess 33 in the outer end of hub 17, and said block and recess are inclosed by a cap 34 secured on the end of the hub. By reference particularly to Figs. 1 and 2, it will be seen that the bifurcated enlargement 28 is so shaped that it will couple with shaft 21 and permit a direct transmission of power at various turning positions of the knuckle. To allow this, the bifurcated enlargement in the base of its recessed portion is tapered or inclined in two directions, so that the T-head 27 will have interlocking engagement in the bifurcated end at various positions of the knuckle.

To prevent entrance of dirt and grit into the pocket 26, a concaved plate 35 is secured to axle 1 and moves inside a similarly curved plate 36 which is secured to knuckle 3. Plate 36 is longer than plate 35 so that it completely houses plate 35 and acts as a dust cap for the shaft coupling.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

The combination with an axle having a forked end, of a knuckle having recesses adjacent its ends receiving the forked end of the axle, said knuckle and said forked end of the axle having registering conical openings; screws engaging in threaded sockets in the knuckle, said screws having conical enlargements fitting the conical openings in the forked end of the axle and the ends of the knuckle, said screws having angular outer portions; washers on said angular outer portions; angular adjusting heads on the outer ends of said screws; and nuts screwed onto threaded portions of the screws locking said washers against the ends of the knuckle, substantially as described.

In testimony whereof I have signed my name to this specification in the presence of two subscribing witnesses.

JOHN EINAR NELSON.

Witnesses:
ANDRU PERSSON,
S. O. SJOLAND.

---

Copies of this patent may be obtained for five cents each, by addressing the "Commissioner of Patents, Washington, D. C."